United States Patent
Liu et al.

(10) Patent No.: US 7,224,512 B2
(45) Date of Patent: May 29, 2007

(54) MICROELECTROMECHANICAL SYSTEM OPTICAL APPARATUS AND METHOD

(75) Inventors: Junhua Liu, Palatine, IL (US); Aroon V. Tungare, Winfield, IL (US); Min-Xian M. Zhang, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/080,597

(22) Filed: Mar. 15, 2005

(65) Prior Publication Data

US 2006/0209385 A1 Sep. 21, 2006

(51) Int. Cl.
*G02B 26/08* (2006.01)

(52) U.S. Cl. .................... 359/298; 359/225
(58) Field of Classification Search ............. 359/198, 359/214, 224, 225, 290–292, 295, 298; 385/18
See application file for complete search history.

(56) References Cited

U.S. PATENT DOCUMENTS

| | | | |
|---|---|---|---|
| 5,629,790 A | 5/1997 | Neukermans et al. | |
| 6,160,230 A | 12/2000 | McMillan et al. | |
| 6,791,235 B2 * | 9/2004 | Miller et al. | 310/311 |
| 2003/0177105 A1 | 9/2003 | Xiao et al. | |
| 2004/0213509 A1 | 10/2004 | Liu et al. | |
| 2006/0193029 A1 * | 8/2006 | Patel et al. | 359/291 |

OTHER PUBLICATIONS

V. Dhuler et al., "A Novel Two Axis Actuator For High Speed Large Angular Rotation", Transducers '97 (International Conference on Solid State Sensors and Actuators), Jun. 1997, 4 pages.
F. Pan et al., "Design, Modeling and Verification of MEMS Silicon Torsion Mirror", SPIE (The International Society for Optical Engineering) vol. 3226, Sep. 1997, 12 pages.
M.D. Johnson et al., "Two Axis Micromirror Scanner" in SPIE (The International Society for Optical Engineering) vol. 3787, Jul. 1999, 8 pages.
"Optical MEMS (MOEMS). Two-axis (2D) MEMS Optical Scanners", [retrieved online on Jan. 7, 2004], Retrieved from the internet URL>http://www.adriaticresearch.org/2D-scanners.htm, 7 pages.

* cited by examiner

*Primary Examiner*—Ricky Mack
*Assistant Examiner*—William Choi

(57) ABSTRACT

A microelectromechanical systems (MEMS) apparatus (100) having a footprint of about 1 to 10 millimeters by about 1 to 10 millimeters comprises a movable member (101) that can be stopped at either of at least two positions by electrically neutral stops (105, 107). Depending upon the needs of a given application, these stops may all be fabricated using materials deposition and removal techniques or some, though not all, may comprise an attached component.

15 Claims, 3 Drawing Sheets

MICROELECTROMECHANICAL SYSTEM OPTICAL APPARATUS AND METHOD

TECHNICAL FIELD

This invention relates generally to microelectromechanical system devices and methodologies and more particularly to optical elements such as an optical switch.

BACKGROUND

Microelectromechanical system (MEMS) technology is known in the art. This art pertains generally to the fabrication and provision of small electro-mechanical components such as switches or the like. It is known, for example, to employ printed wiring board fabrication techniques to fabricate microelectromechanical system components having a footprint of about 1 to 10 millimeters by about 1 to 10 millimeters. Components of this size are sometimes denoted as representing a medium-sized microelectromechanical system element.

Prior art knowledge encompasses the use of microelectromechanical system fabrication techniques to provide an optical switch. For example, an optical mirror can be placed on a movable cantilevered beam. Electrostatic forces are then used to urge the beam towards a particular orientation to thereby selectively alter a deployed angle of the optical mirror. This, in turn, can serve to control the angle by which a light beam will reflect from that optical mirror and hence can control a resultant direction of subsequent propagation (i.e., the relative angle of the optical mirror as corresponds to deployment of the beam serves to switch a resultant optical path of reflection as between two potential paths).

In many cases, the rotational range through which such an optical mirror can operate will depend in large part upon the corresponding degree of movement permitted by the beam itself. This, in turn, will depend at least in part upon the capacitor gap within which the beam typically moves. By increasing this capacitor gap, one also increases the permitted range of movement for the beam and hence also increases the rotational range of the optical mirror.

When increasing the capacitor gap, however, one also typically increases the electrostatic force required to effect desired movement of the beam. As electrostatic force is inversely proportional to the square of the initial capacitor gap while also being proportional to the square of the actuation voltage, the actuation voltage (and typically the size of the actuating capacitor elements) will also increase in size as the electrostatic force increases to correspond to a larger capacitor gap.

As a result, the capacitor elements may become large enough to result in physical contact with the beam. This, in turn, can lead to electrical short circuits and other related problems. Even when it is possible to avoid this problem, the beam itself can experience vibration (and particularly so upon removing the electrostatic force in order to conserve energy). Such vibration can impact the accuracy and/or effective speed of the optical switch itself, as such vibration can readily impart incorrect momentary placement of a reflected optical beam.

BRIEF DESCRIPTION OF THE DRAWINGS

The above needs are at least partially met through provision of the microelectromechanical system optical apparatus and method described in the following detailed description, particularly when studied in conjunction with the drawings, wherein.

Figure 1:
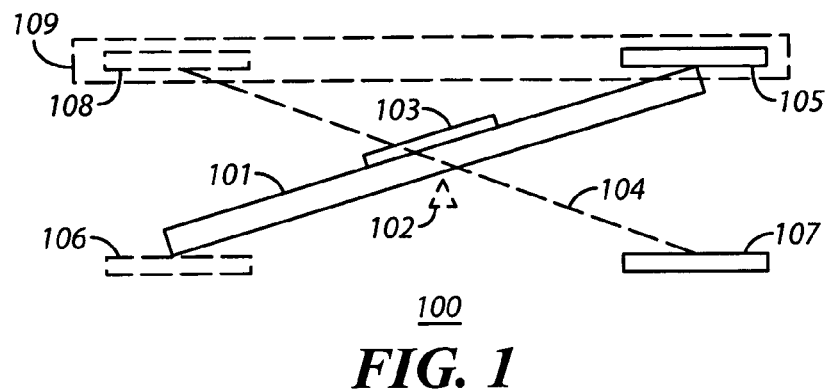
FIG. 1 comprises a schematic side elevational view as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a microelectromechanical system apparatus having a footprint of about 1 to 10 millimeters by about 1 to 10 millimeters preferably comprises a movable member comprising two movable end portions that is movable between at least a first position and a second position. This movable member preferably supports, or itself comprises, an optical component. So configured, the optical component comprises a part of a first optical path when the movable member is in the first position and a part of a second optical path when the movable member is in the second position.

Pursuant to a preferred approach, the apparatus further comprises a plurality of electrically-neutral stops. These stops preferably comprise at least a first stop that prevents movement of the movable member beyond the first position and a second stop that prevents movement of the movable member beyond the second position. Depending upon the needs of a given application, additional stops can be used (to interact, for example, in a similar manner with an opposing end portion of the movable member) to provide, for example, additional stability and positional certainty with respect to the location of the first and/or second position.

If desired, one or more of these stops can comprise a part of an attached element such as, but not limited to, a shell that is disposed over and/or about at least a remaining portion of the apparatus. Depending upon the needs of a given application, if desired, the movable member itself can comprise, at least in substantial part, at least one of electrically conductive metal or an electrically insulating material (such as polyimide) in combination with an electrically conductive metal.

The above generally described results can be achieved using standard fabrication techniques as are ordinarily employed with printed wiring board manufacturing. In particular, the materials deposition and removal processes as characterize such techniques are readily suitable to effect the creation of such elements. The resultant apparatus will further be understood to operate with improved speed and/or accuracy and with a reduced likelihood of intermittent failures due to inappropriate electrical contacts between the movable member and active elements of the electrostatic components.

These and other benefits may become clearer upon making a thorough review and study of the following detailed description. Referring now to the drawings, and in particular to FIG. 1, a generalized schematic overview of an illustrative microelectromechanical system apparatus 100 presents an apparatus preferably having a footprint of about 1 to 10 millimeters by about 1 to 10 millimeters. This apparatus 100 comprises an optical switch having a movable member 101 that is movable between at least a first position (shown in solid lines) and a second position (as illustrated by a phantom line denoted by reference numeral 104). In a preferred approach this movable member 101 moves between these positions by pivoting about at least a first pivot axis (102) (though, as will be shown below, a plurality of pivot axis points can be employed as appropriate).

The movable member 101 is comprised of any suitable material. In a preferred approach, the movable member 101 consists of an electrically conductive metal (such as, but not limited to, copper or nickel) or a polyimide material having a partially or wholly metalized exterior surface (comprised, for example, of silver or other electrically conductive material). So configured, the movable member 101 can serve as a capacitor plate to facilitate selective movement of the movable member 101.

In this generalized embodiment, an optical component 103 is disposed on the movable member 101. The optical component 103 can comprise a separate element or can comprise an integral part of the movable member 101 itself (when, for example, the movable member 101 consists, at least in part, of an optically reflective material). In a preferred approach the optical component 103 comprises a part of both a first optical path and a second, different optical path. More particularly, when the movable member 101 assumes the first position, the optical component 103 comprises a part of a first optical path (by reflecting an incoming beam of light in a first corresponding direction dictated, at least in large part, by the angle of the movable member 101 and hence the optical component 103). Similarly, when the movable member 101 assumes the second position, the optical component 103 comprises a part of a second optical path (by reflecting that incoming beam of light in a second, different direction dictated, again, at least in large part by the angle of the movable member 101 and hence the optical component 103).

Pursuant to these teachings, this apparatus 100 further comprises a plurality of electrically-neutral stops. By one approach, this plurality of electrically-neutral stops comprises at least a first stop 105 that prevents movement of the movable member 101 beyond the first position and a second stop 107 that prevents movement of the movable member beyond the second position. These stops 105 and 107 effect this result by making physical contact with the movable member 101 as the latter moves towards the first/second position. In substantial effect, these stops 105 and 107 aid in specifying the first position and the second position for the movable member 101.

If desired, optional additional stops can be provided. For example, the first stop 105 can operate in conjunction with an opposing stop 106 that further serves to prevent movement of the movable member 101 beyond the first position. In similar fashion, another stop 108 can be positioned opposite the second stop 107 to further serve to prevent movement of the movable member 101 beyond the second position. Such additional stops may, depending upon various other factors, serve, for example, to dampen undesired vibration or oscillation of the movable member 101 when moving to and attaining one of the desired positions. This, in turn, can aid in reducing the time required for the optical component 103 to attain a stable position and thereby the speed with which the optical switch can effect a change between the resultant reflective light paths.

In a preferred approach, most (if not all) of the above described components of the apparatus 100 are formed using material deposition processes such as those that characterize printed wiring board fabrication. For example, at least some of the stops (107 and 106, for example) can be formed in this manner. If desired, however, some (but not all) of the stops (105 and 108, for example) can comprised attached elements; i.e., elements that are not formed via a materials deposition process that is directly associated with the fabrication of other apparatus components such as the movable member 101, the pivot axis 102, and/or the optical component 103. For example, such attached elements can comprise a part of a discrete shell 109 that is disposed over at least the movable member 101. So configured, this shell 109 (which may serve other purposes as well such as protecting the movable elements of the apparatus and/or to support an aperture for the incoming/outgoing light beams) can serve, at least in part, to aid in stopping movement of the movable member 101 and hence in defining the first and second positions of the movable member 101.

So configured, a microelectromechanical system apparatus having a 1 to 10 millimeter by 1 to 10 millimeter footprint can be formed using materials deposition techniques and can be comprised of a pivoting movable member (comprised, for example, of an electrically conductive metal and/or polyimide in combination with an electrically conductive metal) that is movable between at least a first position and a second position. An optical component disposed on the movable member moves with that movable member and comprises a part of a corresponding first and second optical path. Stops are preferably provided to prevent movement of the movable member beyond at least one of the first and second position. If desired, at least some, but not all, of these stops can comprise a part of an attached element such as a discrete shell.

Figure 2:
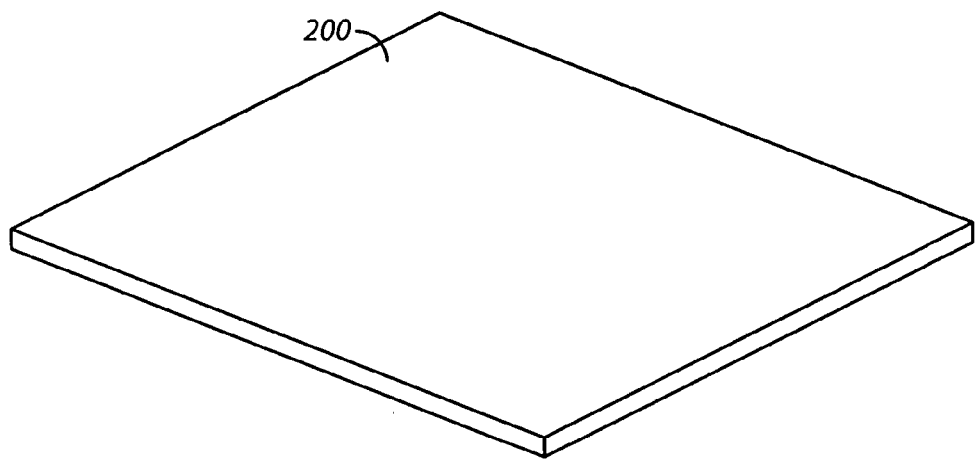
FIG. 2 comprises a perspective view as configured in accordance with various embodiments of the invention.

Referring now to FIG. 2, a specific illustrative embodiment will be described. Those skilled in the art will recognize that this embodiment serves an illustrative purpose only and is not intended to comprise an exhaustive listing of all possible ways and means by which these teachings can be employed. In this illustrative embodiment, a substrate 200 of insulating material (such as, but not limited to, printed wiring board material of choice) provides a base upon which other components of the desired device are built.

Figure 3:
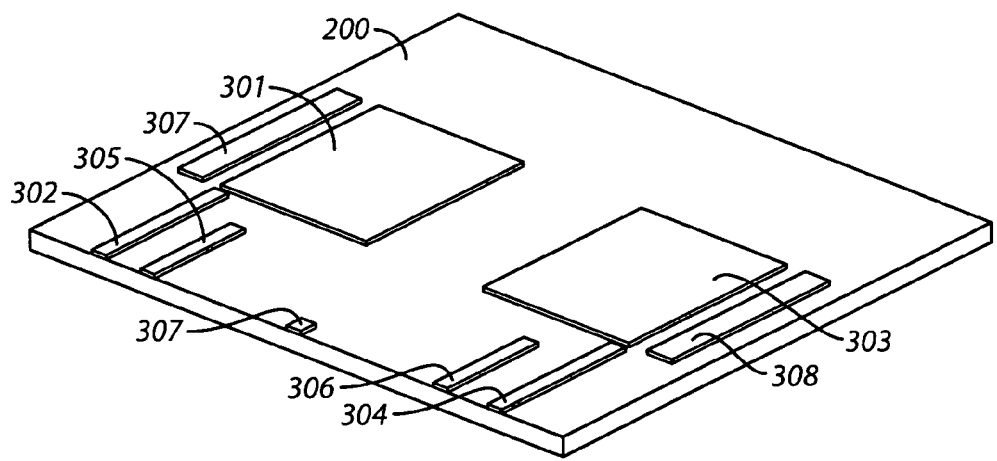
FIG. 3 comprises a perspective view as configured in accordance with various embodiments of the invention.

Referring now to FIG. 3, using materials deposition and etching techniques as are well understood in the art, conductive material (such as copper) serves to define a number of specific bodies. In particular, in this example, a first conductive plate 301 couples to a first conductive lead 302 and a counterpart second conductive plate 303 couples to a second conductive lead 304. These plates 301 and 303 will each serve as a plate in a capacitor that serves, via electrostatic means, to urge movement of a movable member between desired positions. This example also provides for three other conductive traces 305, 306, and 307 (the purposes of which will become evident below) and two stops 307 and 308.

In this embodiment, these stops 307 and 308 are comprised of electrically conductive material. Notwithstanding this material, however, and as will become evident below, these stops 307 and 308 will remain electrically neutral. As will also become more evident, one of these stops (307) corresponds to a first position for a movable member while the other stop (308) corresponds to a second position for that movable barrier.

Figure 4:
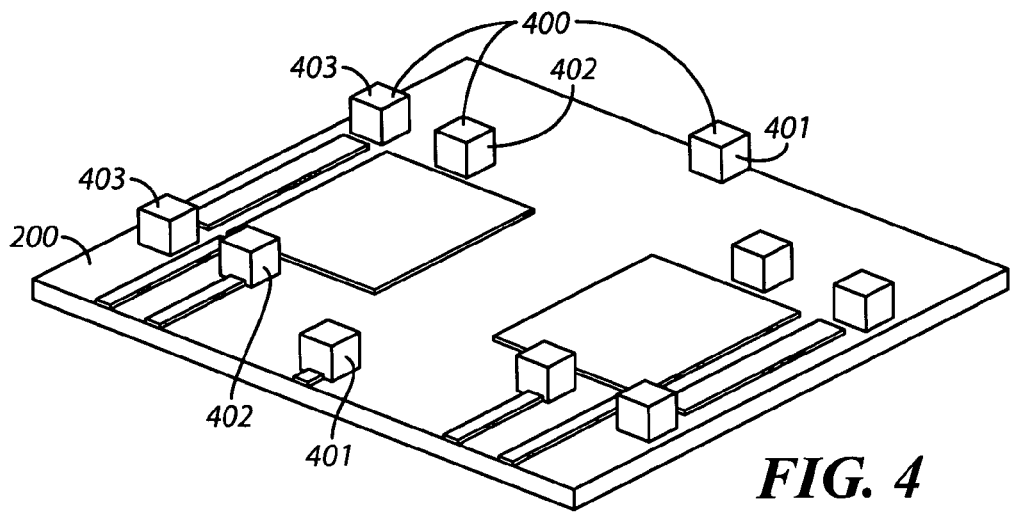
FIG. 4 comprises a perspective view as configured in accordance with various embodiments of the invention.

Referring now to FIG. 4, and again through use of standard deposition and removal techniques of choice, a plurality of posts 400 are formed on the substrate 200. In a preferred approach these posts 400 are comprised of electrically insulator material such as a polymer of choice. These posts 400 include two posts 401 that will serve as pivot points for a movable member, posts 403 that will support, in this embodiment, additional stops, and posts 402 that will support additional conductive plates opposite the previously formed conductive plates 301 and 303. In the depicted embodiment, these posts 400 have a similar (or essentially identical) height. Other heights might be accommodated to meet the needs and/or limitations of a given application or fabrication process. Conductive vias can be formed through such posts as necessary and in accordance with prior art technique in order to establish a conductive path where appropriate.

Figure 5:
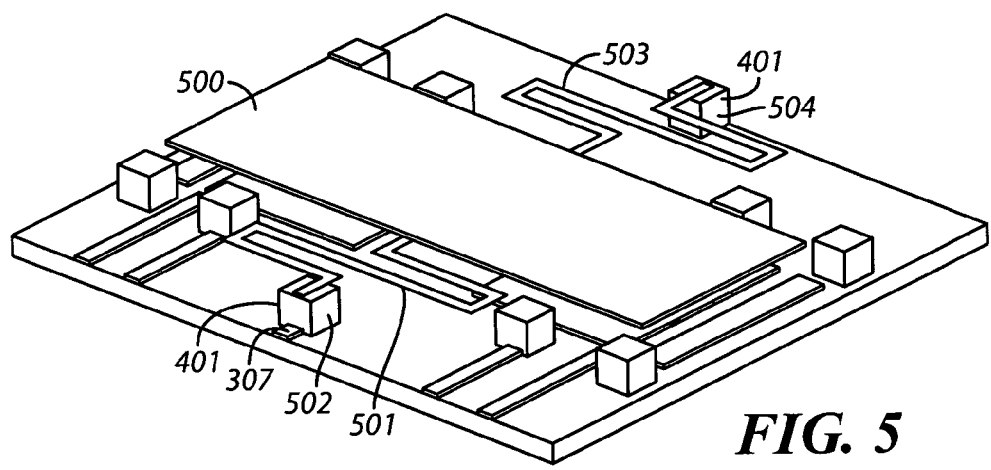
FIG. 5 comprises a perspective view as configured in accordance with various embodiments of the invention.

Referring now to FIG. 5 (and again using a materials deposition and removal process of choice) a movable member 500 comprises, in this illustrative embodiment, a pivoting cantilevered beam comprised of an appropriate metal such as nickel, silver plated nickel, or the like or a polyimide core having metal coating of, for example, silver to thereby facilitate having the movable member 500 serve as a capacitor plate. When comprised of polyimide, laser cutting may be employed if desired to attain the desired shape. In this illustrative embodiment the movable member 500 has opposing serpentine axes 501 and 503 that each rest upon a corresponding one of the earlier provided posts 401. In particular, a first one of the axes 501 rests on a first one 502 of the latter posts 401 and a second one of the axes 503 rests on a second one 504 of the latter posts 401.

So configured it will be readily understood and appreciated that the movable member 500 can pivot about its central axis in a seesaw manner such that either end of the movable member 500 can move upwardly or downwardly. It will therefore also be noted that, in this illustrative embodiment, the opposing ends of the movable member 500 extend beyond the boundaries of the previously formed conductive plates 301 and 303 and extend sufficiently far to permit contact between the outer edges of the movable member 500 and the previously provided stops 307 and 308 when pivoted so as to permit such contact.

Figure 6:
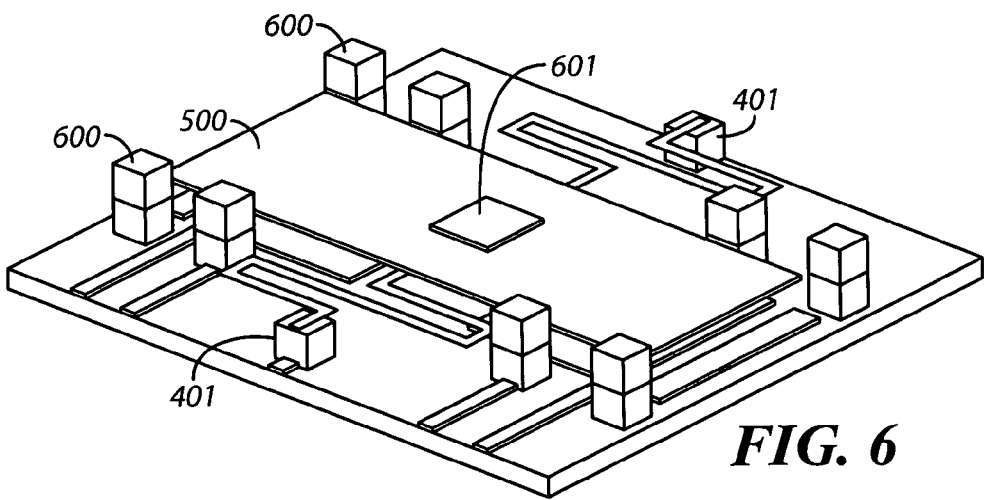
FIG. 6 comprises a perspective view as configured in accordance with various embodiments of the invention.

Referring now to FIG. 6, additional insulating posts 600 are now formed atop all of the previously provided posts 400 aside from the posts 401 that serve to support the movable member 500. An optically reflective element 601 can also be disposed on the movable member 500 at this time (assuming that the movable member 500 did not already comprise a sufficiently reflective component). This optically reflective element 601 preferably comprises an optical mirror and can comprise, for example, a deposited layer of reflective metal such as silver. The optically reflective element 601 can be placed where desired though a central location will likely serve as a beneficial position for many applications.

Figure 7:
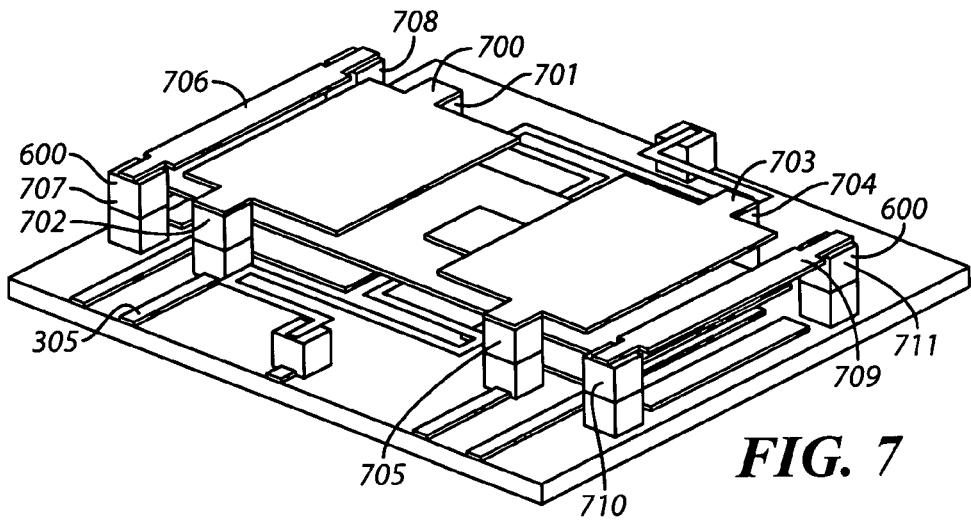
FIG. 7 comprises a perspective view as configured in accordance with various embodiments of the invention.

Referring now to FIG. 7, materials deposition and removal processes are now preferably employed to produce two additional conductive plates 700 and 703 that rest atop corresponding insulating posts 701, 702, 704, and 705, respectively. These additional conductive plates 700 and 703 are preferably placed in opposition to the previously provided conductive plates 301 and 303 and serve together with those plates 301 and 303 to effect selective creation of electrostatic fields that can influence movement of the movable member 500. To illustrate, by imposing a voltage having a first polarity on the movable member 500 and a voltage having an opposing polarity on one of the conductive plates (such as the conductive plate denoted by reference numeral 703), both the movable member 500 and the selected conductive plate 703 will serve as capacitor plates and the movable member 500 will pivot and move its end portion towards the selected conductive plate 703. In the embodiment depicted, it would also be possible to also apply the same opposing polarity voltage to the crosswise conductive plate 301 to thereby also urge the opposing end of the movable member 500 towards the crosswise conductive plate 301 to thereby urge the movable member 500 towards a particular position at both of its ends.

In this illustrative embodiment, additional stops 706 and 709 are also formed atop corresponding posts 707, 708, 710, and 711. As with the previous stops 307 and 308, these stops 706 and 709 are formed of an electrically conductive material (thereby permitting their fabrication in tandem with the conductive plates 700 and 703) but, again, remain electrically neutral and without operable connection to any other electrical path or element (aside from interaction with the movable member 500 as described below).

Figure 8:
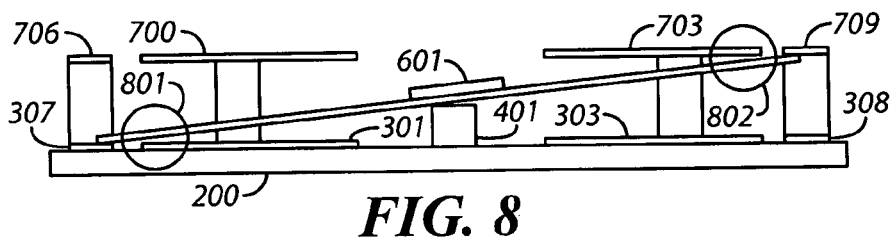
FIG. 8 comprises a schematic side-elevational view as configured in accordance with various embodiments of the invention.

Referring now to FIG. 8, it will be understood and appreciated by those skilled in the art that movement of the movable member 500 can be influence by electrostatic fields as are generated by selective energization of the movable member 500 and at least one of the conductive plates 301, 303, 700, and 703 in accordance with known practice and technique. When this occurs, the movable member 500 is selectively placed in either a first position or a second position. Movement of the movable member 500 concludes (and the respective corresponding position thereby determined) by interaction between the ends of the movable member 500 and the stops. For example, as illustrated, where the movable member 500 has been urged towards a first position, two of the stops 307 and 709 both serve to limit movement of a corresponding end of the movable member 500 beyond the stops themselves through contact with the respective ends of the movable member 500.

Those skilled in the art will appreciate that these stops 307 and 709 establish the first position while also precluding contact between the movable member 500 and any of the conductive plates (and in particular, in the position illustrated, with two of the conductive plates 301 and 703 as is denoted by the detail circles 801 and 802). So configured, the movable member 500 is readily switched between a first and a second position in a manner that both precludes inappropriate electrical interaction between the movable member and the controlling plates while also tending to assure a firm location for the first and second position.

Figure 9:
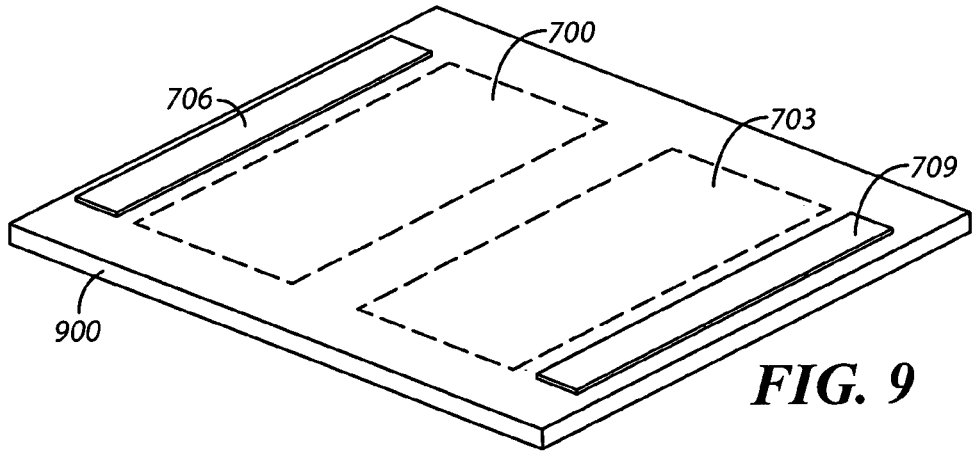
FIG. 9 comprises a perspective view as configured in accordance with various embodiments of the invention.

In the illustrative example provided above, all of the stops are fabricated using materials deposition processing. As taught earlier, however, if desired, some of these stops can be provided via attachment of pre-formed components. In a preferred approach, such pre-formed stops comprise a part of a larger covering such as a discrete shell. As one example, and referring now to FIG. 9, two of the above-described stops 706 and 709 can be formed (using, for example, printed wiring board materials deposition/removal processing) on an insulating substrate 900. This substrate can then be placed over the structure as described above with respect to FIG. 6, such that the stops 706 and 709 are oriented inwardly towards the movable member 500. Upon then affixing these structures to one another, a full complement of stops will again be provided.

Also, if desired, the conductive plates 700 and 703 described above can be provided on this substrate 900 instead of forming them as described above. Then, again when disposing the substrate 900 over the structure of FIG. 6, the remaining capacitor plates will be provided (those skilled in the art will appreciate that additional conductive traces would then likely be formed on the substrate 900 in order to facilitate energization of these conductive plates; such additional conductive traces are not shown here for the sake of simplicity and clarity).

Figure 10:
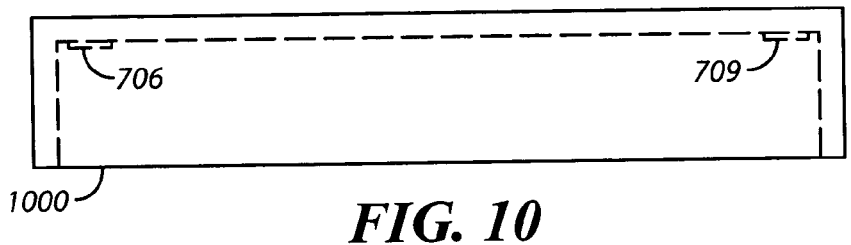
FIG. 10 comprises a side-elevational view as configured in accordance with various embodiments of the invention.

Other form factors may also be employed for such a shell. As but one illustration of many, and referring now to FIG. 10, the substrate that supports the stops 706 and 709 (as well as the conductive plates (not shown) if so desired) can comprise a housing 1000 having side walls. These side walls can serve, for example, to properly position the height of the stops 706 and 709 with respect to the movable member.

Those skilled in the art will understand and appreciate that the above-described shells may have one or more optical light apertures formed therethrough to accommodate an incoming light beam (or beams) and/or an outgoing reflected light beam (or beams). As the size, location, shape, and number of such apertures will vary with the needs and requirements of each individual application, exemplary apertures are not shown here for the sake of simplicity and clarity.

So configured, a microelectromechanical system optical switch can be readily and reliably fabricated using ordinary and well-understood printed wiring board fabrication techniques (in addition to standard placement and mounting techniques when employing an attached shell as described above). The resultant optical switch supports relatively high speed switching due to an improved ability to quickly move the movable member from one stable position to another. Furthermore, these benefits are gained without undue risk of inappropriate electrical connections occurring during such movement.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A microelectromechanical system (MEMS) apparatus comprising:
    a movable member comprising two movable end portions that is movable between at least a first position and a second position;
    an optical component disposed on the movable member, such that the optical component comprises a part of a first optical path when the movable member is in the first position and a part of a second optical path when the movable member is in the second position;
    a plurality of electrically-neutral stops, comprising at least a first stop that prevents movement of the movable member beyond the first position and a second stop that prevents movement of the movable member beyond the second position;
    wherein the at least a first stop further comprises at least a first pair of stops, wherein a first one of the first pair of stops is disposed to contact a first end of the movable member when the movable member is in the first position and a second one of the first pair of stops is disposed to contact a second end of the movable member when the movable member is in the first position.

2. The apparatus of claim 1 wherein the first end of the movable member comprises an end of the movable member that opposes the second end of the movable member.

3. The apparatus of claim 2 wherein the at least a second stop further comprises at least a second pair of stops, wherein a first one of the second pair of stops is disposed to contact the first end of the movable member when the movable member is in the second position and a second one of the second pair of stops is disposed to contact the second end of the movable member when the movable member is in the second position.

4. The apparatus of claim 1 wherein at least one of the plurality of electrically-neutral stops is comprised of electrically insulating material.

5. The apparatus of claim 1 wherein at least one of the plurality of electrically-neutral stops is comprised of electrically conductive material.

6. The apparatus of claim 1 wherein the movable member comprises a beam that pivots about at least a first pivot axis.

7. The apparatus of claim 1 wherein:
    at least one of the plurality of electrically-neutral stops comprises an element that is formed via a material deposition process; and
    at least one of the plurality of electrically-neutral stops comprises an attached element.

8. The apparatus of claim 1 wherein the movable member consists of at least one of:
    electrically conductive metal; and
    polyimide having a metalized exterior surface.

9. A microelectromechanical system (MEMS) apparatus comprising:
    a movable member comprising two movable end portions that is movable between at least a first position and a second position;
    an optical component disposed on the movable member, such that the optical component comprises a part of a first optical path when the movable member is in the first position and a part of a second optical path when the movable member is in the second position;
    a plurality of electrically-neutral stops, comprising at least a first stop that prevents movement of the movable member beyond the first position and a second stop that prevents movement of the movable member beyond the second position;

wherein the movable member comprises a beam that pivots about at least a first pivot axis and a second pivot axis, which second pivot axis is different from the first pivot axis.

10. A microelectromechanical system (MEMS) apparatus comprising:

a plurality of electrical circuit elements;

an optical element responsive, at least in part, to selective energization of at least one of the plurality of electrical circuit elements;

wherein at least one of the plurality of electrical circuit elements comprises an element that is formed via a material deposition process and at least one of the plurality of electrical circuit elements comprises an attached element;

wherein the attached element comprises a part of a capacitor and a shell comprised of electrically insulating material and electrically conductive material.

11. The apparatus of claim 10 further comprising:

a movable member having the optical element disposed thereon, wherein the movable member is movable between at least a first position and a second position; and wherein the shell further serves as a stop for the movable member that corresponds to the first position.

12. The apparatus of claim 11 wherein the shell further serves as a stop for the movable member that corresponds to the second position.

13. The apparatus of claim 12 wherein the movable member substantially consists of electrically conductive metal.

14. The apparatus of claim 12 wherein the movable member substantially consists of an insulating member that supports an electrically conductive metal.

15. The apparatus of claim 10 wherein the shell has at least one optical aperture disposed therethrough.

* * * * *